TELEPHONE AMPLIFYING APPARATUS

Filed June 2, 1948 2 SHEETS—SHEET 1

Inventors:
M. L. M. Souget and
N. L. Chalfin

By Ross C. Murray

March 24, 1953 M. L. M. SOUGET ET AL 2,632,811

TELEPHONE AMPLIFYING APPARATUS

Filed June 2, 1948 2 SHEETS—SHEET 2

Inventor
M. L. M. Souget and
N. L. Chalfin,

By Ross C. Murray

Patented Mar. 24, 1953 2,632,811

UNITED STATES PATENT OFFICE 2,632,811

TELEPHONE AMPLIFYING APPARATUS

Matthys L. M. Souget and Norman L. Chalfin, New York, N. Y.; said Chalfin assignor to said Souget Application June 2, 1948, Serial No. 30,698

4 Claims. (Cl. 179—1)

This invention relates to loud-speaking arrangements of the type disclosed in application Serial No. 713,951, filed December 4, 1946, for use with telephones, to enable incoming signals to be amplified sufficiently to render it unnecessary for the user to hold the receiver or handset of the telephone against his ear.

It is a principal object of the invention to provide such an amplifier in which the telephone instrument merely rests upon a suitable cabinet, the pick-up of energy from the hand-set or telephone instrument being accomplished by magnetic induction from the magnet coils housed within the receiver portion of such instrument, thus making it unnecessary to provide an acoustic coupling from the receiver diaphragm to a microphone or the like.

A further object of the invention is to provide a device of this type which not only operates to amplify incoming signals for reproduction at a convenient level to free the user from the necessity of holding the telephone instrument, but which also provides a greatly increased sensitivity of the pickup of energy into the microphone or "transmitter" portion of the telephone, whereby the user is enabled to speak from any convenient distance from the device, rather than directly into the transmitter. According to the invention, this increased sensitivity is obtained by virtue of the arrangement and relationship of the amplifier and the telephone instrument, and without requiring a separate amplification channel into the telephone transmitter, as has heretofore been resorted to for the accomplishment of this function. This utilization of the parts enables a great simplification and economy in the apparatus, as compared with devices requiring two separate amplification channels as known in the art.

Still another object of the invention is to provide such a device in which acoustical feed-back between the loud-speaker provided to enhance incoming conversation, and the receiver portion of the telephone, and hence via ordinary side-tone routes, to the transmitter of the telephone, operates to enhance the sensitivity of the telephone in picking up conversation originating at points relatively remote from the telephone, such as from the user occupying a spaced position with reference to such telephone.

A further object of the invention is to provide a single amplifier channel provided with an adjustable feed-back of electrical energy from the output end thereof to the input end, providing for a controlled degree of degenerative coupling therebetween, for the control of oscillations or "singing" which might under some conditions result from the acoustical feed-back path mentioned above.

An additional object is to provide for a combined gain and feed-back adjustment arranged to provide a maximum degenerative or negative feed-back when the amplifier is adjusted for maximum gain, and conversely to reduce the amount of negative feed-back when the amplifier is adjusted to a lower gain or amplification. Conveniently, this is accomplished by unicontrol means, such as a pair of potentiometers ganged or controlled from a common shaft.

Still another object is to provide such an equipment which will be extremely compact in arrangement, simple to use, and economical to manufacture, and which will require a minimum of servicing or maintenance.

The above and other objects and advantages of the invention will best be understood by referring to the following detailed specification of a preferred embodiment thereof, taken in connection with the appended drawings, in which Fig. 1 is a perspective view of a complete instrument in accordance with the invention, showing the position occupied by a telephone handset used therewith;

Figure 1:
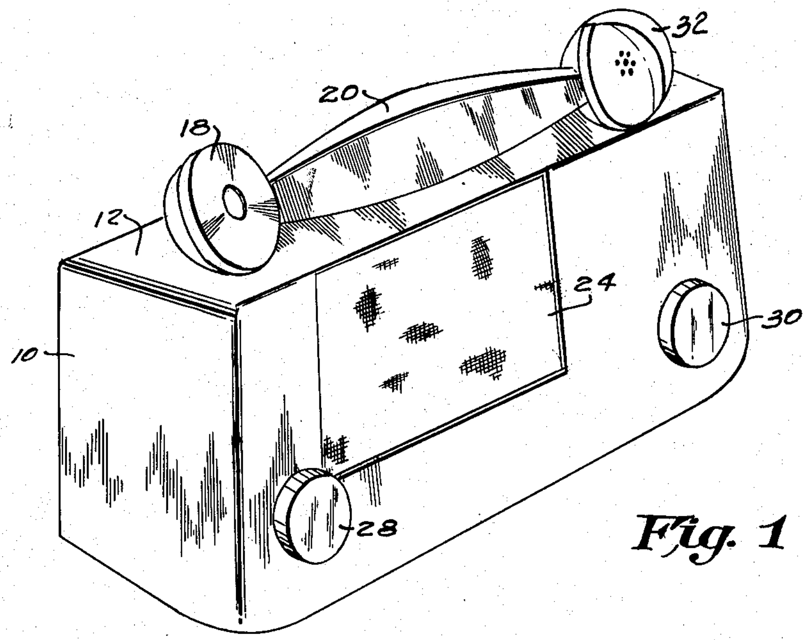
Figure 2:
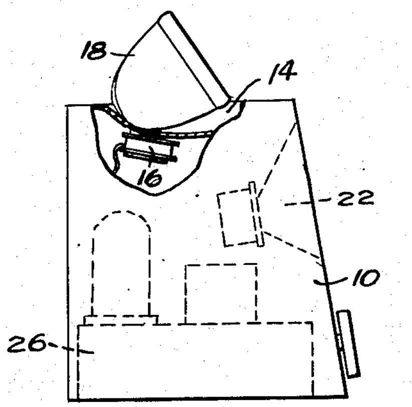
Fig. 2 is a side elevational view of the apparatus, parts being broken away to show the location of the magnetic pick-up device with respect to the receiver end of the hand-set.

Referring now to Figs. 1 and 2 of the drawing, there is illustrated a complete apparatus in accordance with the invention, comprising a cabinet generally designated by numeral 10 whose upper surface 12 is formed with shallow wells, depressions or pockets, or equivalent formations for the reception of a telephone hand-set 20 of usual form. One of these pockets, designated by numeral 14 in Fig. 2, is provided with a magnetic pick-up coil or coil set 16 whose pole-pieces may either lie just beneath the wall of the cabinet, or may pass through an aperture therein so as to be flush with the outer surface of the pocket floor, in position for magnetic induction pick-up of energy in the magnet coils of the receiver end 18 of the hand-set 20. It will be understood that, while a similar pocket or formation is provided at the other end of the top wall 12 of cabinet 10 to receive the transmitter end of the hand-set, no energy pick-up is required at this end, since according to the invention a single channel amplifier is used both to enhance received signals and to raise the sensitivity of the hand-set to outgoing speech.

A loudspeaker 22 is housed within cabinet 10 in such a way as to reproduce sounds through a grill 24 or the like located in the frontwall of the cabinet, and an amplifier chassis 26 is also positioned within said cabinet. Usual on-off switch and volume controls 28 and 30 are mounted for operation from a position in front of the cabinet.

In general, the operation of the device for rendering received signals audible at points relatively remote from the telephone receiver 18, is as follows: energy from the telephone line energizes the magnet coils therein to vibrate the receiver diaphragm in the usual way. At the same time, this energy results in a leakage magnetic field about these coils, a portion of which extends outside the receiver housing and is picked up by (by inducing a voltage in) the coil or coils 16, thence through the amplifying channel provided on chassis 26, and to the loudspeaker 22. This provides for sufficient amplification of incoming signals to enable them to be heard by a user several feet away from the apparatus, and hence frees him from the necessity to hold the hand-set to his ear, which is particularly onerous during silent or waiting periods, as fully pointed out in the above mentioned specification.

At the same time, due to the existence of a side-tone channel between the transmitter 32 of the hand-set and the receiver portion 18, via internal connections in the hand-set, any speech signals originating within a few feet of the cabinet 10 and picked up by either transmitter 32 or receiver 18 (which latter acts as an energy pickup when its diaphragm is vibrated by sound waves, in a known manner) will ultimately also pass through the amplifier channel and be passed over the outgoing line, either by an acoustical path from speaker 22 to transmitter 32, or by induction into the hand-set circuits from high-level portions of the contained amplifier. The precise nature of this pick-up is not fully understood, but exhaustive experiments have shown that the arrangement disclosed provides a perceptible enhancement in the sensitivity of pick-up or speech within the room where the cabinet 10 is located, in addition to the expected amplification of signals coming in over the telephone line.

Figure 3:
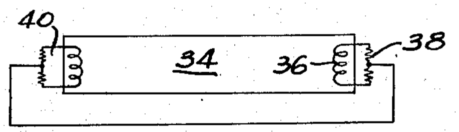
Fig. 3 is a schematic view of one form of electrical feed-back used in amplifier channels.

In order to eliminate the singing or howling which is produced under some conditions of operation, probably due to acoustic feedback between the transmitter 32 and loudspeaker 22, there is provided a negative electrical feed-back path between the output and input circuits of the amplifier. To understand this feature, reference may be had to Fig. 3 of the drawings, in which numeral 34 represents a usual form of audio amplifier, of one or more stages, across the output transformer 36 on which is connected a bleeder resistor 38 a point on which is connected in phase-opposing relation to a point on the input circuit 40. As is well known, such a connection operates degeneratively, that is, operates to reduce or eliminate distortion or spurious voltages occurring in the amplifier channel itself, since the feed-back voltage opposes the input voltage to the first stage, in a manner proportionately related to the output energy of the channel. At the same time, such a connection acts to stabilize the amplifier against oscillation due to coupling between output and input energy.

Figure 4:
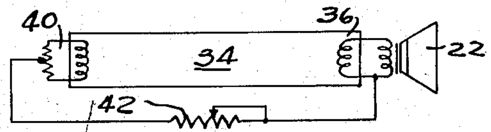
Fig. 4 is a similar view of an amplifier in which the degree of feed-back is adjusted by varying the impedance of the feed-back path.

The degree of negative or degenerative feed-back provided may be adjusted by altering the resistance of the feed-back path, as by a series resistor indicated in Fig. 4 by numeral 42, and which may desirably be made adjustable to accommodate for various conditions which may arise.

It is desirable that the distance between centers of transmitter 32 and loudspeaker 22 be kept not less than 6½", which may be accomplished even with the compact cabinet of Fig. 1 by decentering the speaker; that is by moving it towards the receiver end of the cabinet, as there shown. This further reduces undesired coupling between transmitter and speaker.

Figure 5:
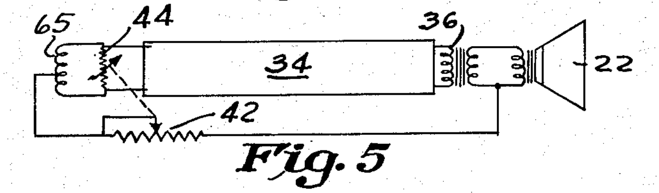
Fig. 5 is a schematic view of an amplifier provided with a gain control ganged for concomitant adjustment with an adjustment of the feed-back path.

Fig. 5 of the drawings illustrate a further development of the Fig. 4 arrangement, in which there is provided an amplifier gain control here shown as an adjustable resistance 44 shunting the input to the channel, and as there indicated, it is desirable to couple the gain control and the degeneration control 42, so as to provide a maximum of inverse or negative fed-back at times when the amplifier is being used at high gain, since it is under such a condition that singing or howling is most likely to occur. Where conditions permit a lower level of amplification, as where the input signal level is relatively great, then the gain control 44 may be adjusted downward, which will automatically reduce the amount of negative fed-back by an increase in resistance 42.

Figure 6:
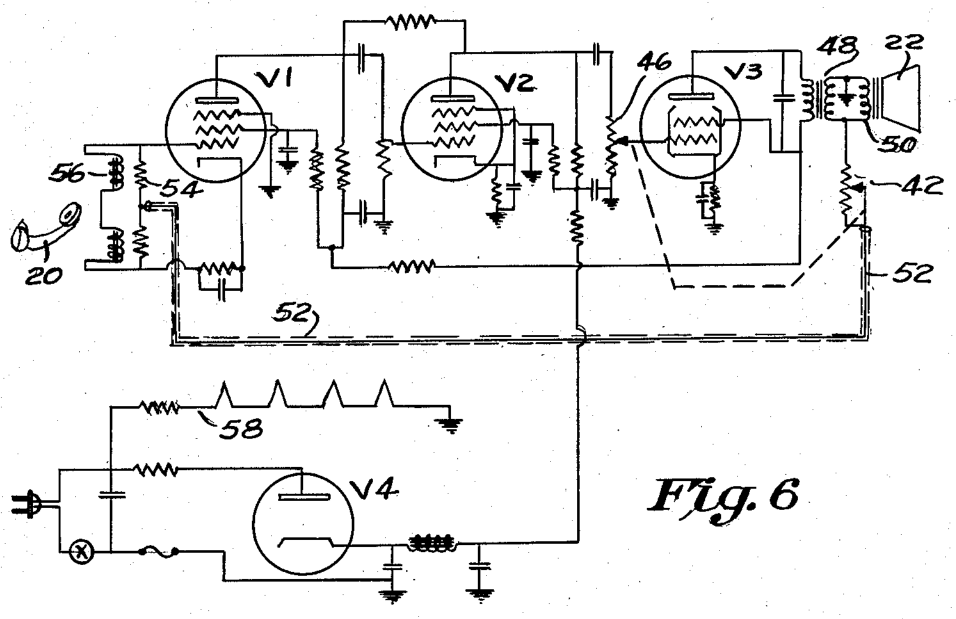
Fig. 6 is a circuit diagram of a complete amplifier provided with the feed-back arrangement.

Fig. 6 of the drawings illustrates a suitable circuit for the amplifier of the apparatus, shown as a three stage amplifier comprising a pair of cascaded amplifier tubes V1 and V2, and a power amplifier V3. The voltage output of tube V2 is applied against the grid leak resistor 46 which is a potentiometer whose arm picks off an adjustable voltage for application to the control grid of tube V3, thus providing a manual adjustment for the gain of the amplifier. The power output from tube V3, which is desirably of the beam type, is coupled to speaker 22 through a transformer 48, which matches the impedance of the output circuit of tube V3 to the voice coil 50 of the speaker. One side of this transformer output is coupled through an adjustable resistor 42 via a shielded lead 52 to a point on a bleeder resistor 54 across the input line from the magnetic pick-up coil or coils 56 or to a point on the topped pick-up coil 65 (Fig. 5). As indicated above, variable resistors or potentiometers 42 and 46 are preferably ganged for uni-control as indicated by the dash line connecting these elements, the phasing being such that an increase in amplifier gain provides an increase in the degree or percentage of audio electrical feed-back along line 52.

Plate or anode supply voltage for tubes V1, V2 and V3 may be obtained in a known manner from the power line through a rectifier tube V4 and filter network, the cathodes of all four tubes being heated by a series circuit indicated at 58. In this and other respects, the arrangement and operation of the amplifier are well known to those skilled in this art.

Figure 7:
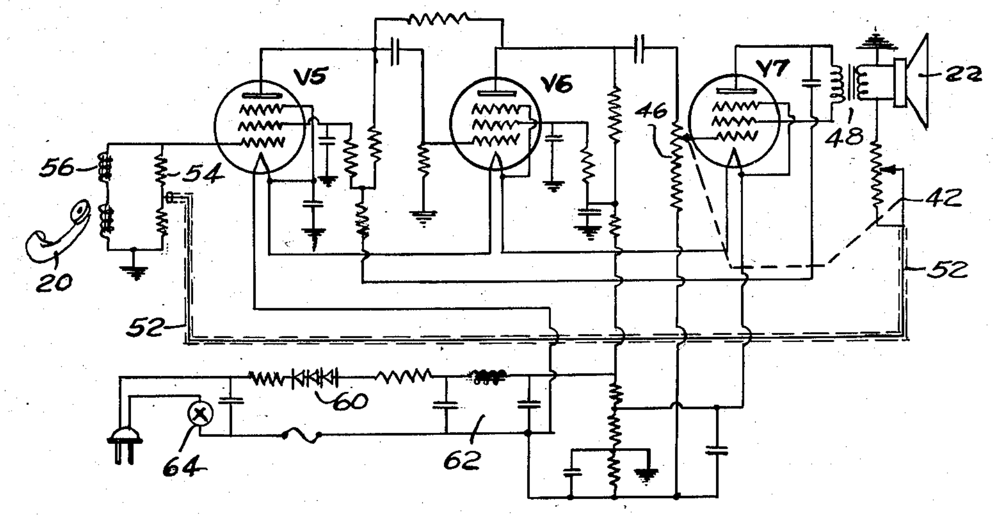
Fig. 7 is a similar diagram of a modified form in which are used quick-heating vacuum tubes so that the device may be left unenergized between uses, but promptly be put into service condition as required by the user.

Fig. 7 of the drawing illustrates a circuit arrangement which utilizes quick-heating vacuum tubes of the filamentary cathode type such as a pair of voltage amplifier tubes V5 and V6 of the type known commercially as type 1L4, and a power output tube V7 of the 3A4 type. Filament heating and plate power for these tubes are obtained from a rectifier circuit preferably using a dry disc type of rectifier 60 and filter network 62, energized from the A. C. line in a known manner. The feed-back path in this circuit is the same as illustrated in Fig. 6, the advantage of the Fig. 7 arrangement being that the amplifier may be kept in an off condition, from which it may be put in working condition in a matter of seconds when required, thus conserving power which must be drawn continuously in the Fig. 6 arrangement. The amplifier of Fig. 7 may conveniently be turned off and on by a switch 64 in the power line, and which may either be manually controlled, or may be closed automatically when the hand-set is placed in proper position atop cabinet 10, in a manner analogous to that disclosed in the prior aplication referred to above.

It will be seen that the above arrangements satisfy all of the objects of the invention in a practical manner, but it is to be understood that many changes of a minor nature can be made by those skilled in the art without departing from the spirit of the invention as defined in the appended claims.

What is claimed is:

1. In combination, a cabinet having a top surface configured to receive and support a telephone handset of the type having spaced transmitter and receiver portions, a magnetic pickup in said cabinet adjacent the top surface thereof and located to pick up energy from the receiver portion of a handset thereon, a single means for amplifying the output of said pickup and for amplifying sound energy picked up in the receiver and transmitter portions of said handset, and a degenerative feedback connection from the output of said amplifying means to its input.

2. The invention in accordance with claim 1, and means for adjusting the attenuation of said feedback connection.

3. In combination, a cabinet having a surface adapted to receive and support a telephone hand-set, a magnetic pick-up located adjacent said surface to pick up energy from said hand-set, an amplifier channel in said cabinet connected with said pick-up and arranged to amplify the energy thereof, a loudspeaker energized by said amplifier, means for controlling the gain of said amplifier channel, a feed-back path between the out-put and in-put ends of said channel, means for adjusting the magnitude of feed-back energy along said path, and a single manual control for simultaneously adjusting the gain of said amplifier and the magnitude of said feed-back energy.

4. In a device of the class described, a cabinet having a top surface shaped to support a telephone handset in a substantially horizontal position, a magnetic flux pickup mounted in said cabinet adjacent the top surface thereof and located in close proximity to the receiver portion of a handset thereon to pick up electrical energy therefrom, means for amplifying the output of said pickup, said amplifying means being provided with an adjustable degenerative feed-back connection between its input and output, said amplifying means being so connected as to amplify sound energy which is picked up by both the receiver and transmitter portion of the handset and to feed said amplified energy to the outgoing line of said handset.

MATTHYS L. M. SOUGET.
NORMAN L. CHALFIN.

REFERENCES CITED

The following references are of record in the file of this patent:

UNITED STATES PATENTS

| Number | Name | Date |
|---|---|---|
| 1,697,007 | Hood | Jan. 1, 1929 |
| 2,005,973 | Hellmann | June 25, 1935 |
| 2,160,829 | Cherry | June 6, 1939 |
| 2,214,992 | Chevassns | Sept. 17, 1940 |
| 2,367,110 | Fayers | Jan. 9, 1945 |
| 2,381,097 | Adams | Aug. 7, 1945 |
| 2,402,341 | Patterson | June 18, 1946 |
| 2,501,955 | McWane | Mar. 28, 1950 |